United States Patent Office 2,874,010
Patented Feb. 17, 1959

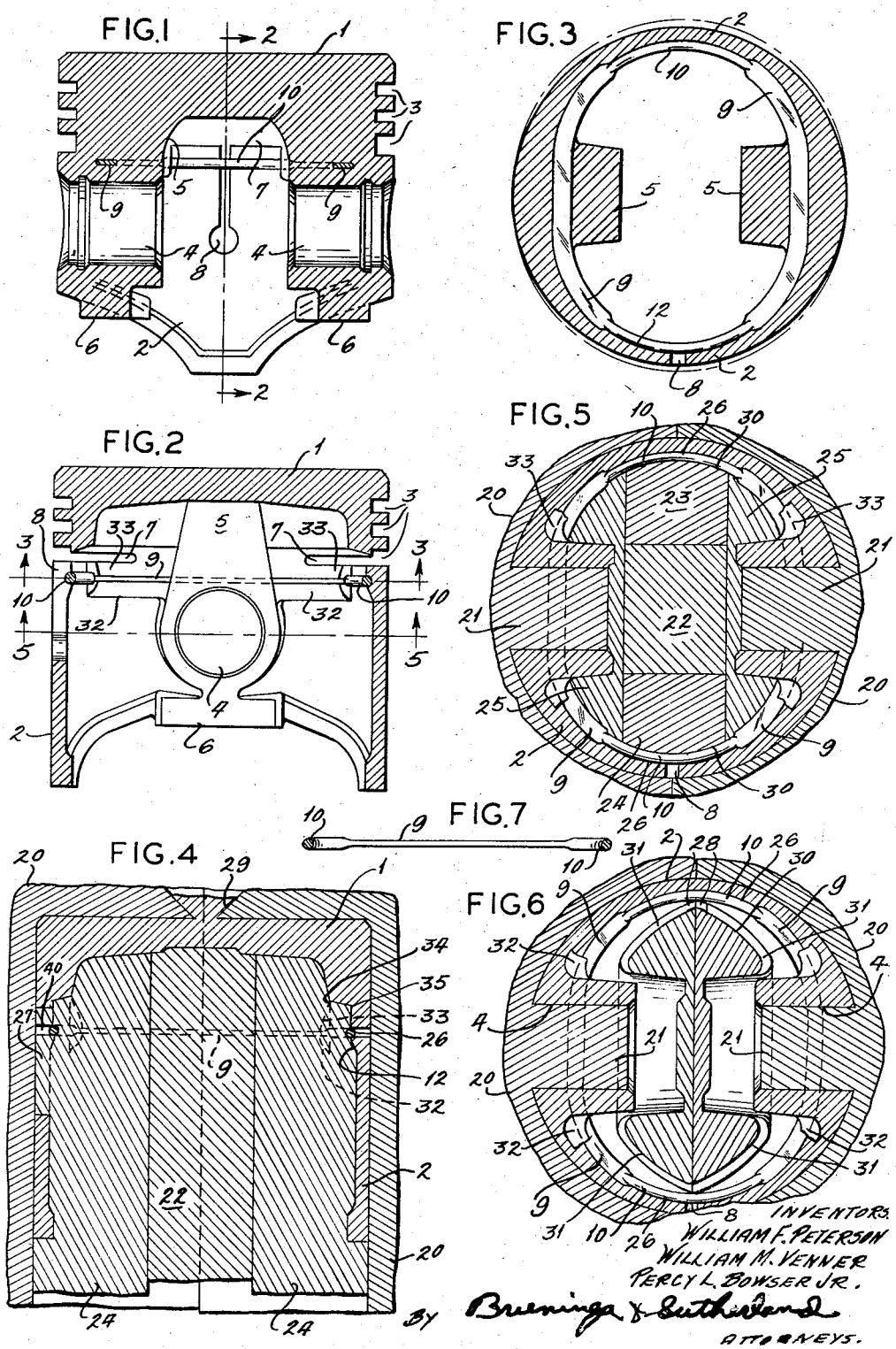

2,874,010
TRUNK PISTON

William F. Peterson, Creve Coeur, William M. Venner, Brentwood, and Percy L. Bowser, Jr., Ladue, Mo., assignors to Sterling Aluminum Products, Inc., St. Charles, Mo., a corporation of Missouri Application March 18, 1957, Serial No. 646,719

4 Claims. (Cl. 309—13)

This invention relates to trunk pistons, particularly of a type designed for use in internal combustion engines for automobiles. Such pistons are usually constructed of a metal of relatively high thermal expansion, such as aluminum and magnesium alloys containing various alloying elements such as copper, silicon, nickel, manganese, etc. Where silicon is employed on the order of 12%, the thermal expansion is materially reduced. Copper, nickel and manganese impart hardness and strength to the alloy. The temperatures encountered in internal combustion engines are, however, high, so that there is liability of seizure when hot and of looseness when cold.

A trunk piston of the type described comprises a head of relatively thick section, a skirt of relatively thin section and wrist pin bosses on and inside of the skirt. The head is grooved to receive the packing rings and is of smaller diameter than the skirt, which latter provides the guiding crosshead of the piston. The skirt is separated from the head in one or both regions of the thrust faces by one or two circumferential slots, and one or two vertical slots may also be provided. The skirt may be of circular contour, or oval with the major diameter in the regions of the thrust faces. The skirt is usually given a standard taper with a smaller diameter at the top.

In Patent No. 2,780,505, issued to applicants' assignee, a control ring of a metal of relatively low thermal expansion extends entirely around the skirt at the top thereof, which skirt is separated from the head in one or both thrust faces. That control ring is cast-anchored in the boss regions, but is unanchored in one or both thrust faces by exposing the inner part of the control ring. However, such cast-anchoring is accomplished by continuing the envelopment of the control ring by the piston metal extensively into the separated thrust face or faces.

One of the objects of this invention is to simplify the construction of the piston described in the patent and to secure an improved mode of operation and an improved control of the expansion of the skirt.

Further objects will appear from the detailed description, in which will be set out an illustrative embodiment of this invention; it is to be understood however, that this invention is susceptible of various embodiments within the scope of the appended claims.

Referring to the accompanying drawing:

Fig. 1 is a vertical section on the wrist pin axis of a piston embodying this invention;

Fig. 2 is a section on the lines 2—2, Fig. 1;

Fig. 3 is a section on the lines 3—3, Fig. 2;

Fig. 4 is a view similar to Fig. 2, but showing the mold and core in and over which the piston is cast;

Fig. 5 is a section on the line 5—5 of Fig. 2, but showing the mold and core and with the core expanded;

Fig. 6 is a view similar to Fig. 5, but showing the core collapsed; and

Fig. 7 is a cross-section of the control ring.

Generally stated, and in accordance with an illustrative embodiment of this invention, the control ring comprises a first sector or sectors partially exposed internally along a thrust face or faces and unanchored therein, and second sectors displaced circumferentially from the first sectors and cast-anchored along the boss regions. However, the cross-sections of the second sectors are of greater rigidity radially than the cross-section of the first sector or sectors, the second sectors being proportioned as to their cross-sections and length in accordance with the desired radial stress or stresses to be imparted to the first sector or sectors and the piston metal thereover.

Referring to the accompanying drawing, and more particularly to Figs. 1, 2 and 3; 1 designates the head and 2 the skirt of a piston embodying this invention. The head, which is of relatively heavy section, is provided with packing ring grooves 3, while the skirt is provided with inwardly extending wrist pin bosses 4, which are connected to the head by the pillars 5, and with balancing lugs 6. The head is separated from the skirt by one or two circumferential slots 7, in the region or regions of the thrust face or faces and, in this embodiment, those slots are in the region of the lowest packing ring groove 3. One or more vertical slots 8 may be provided in one or both thrust faces.

A control ring 9, 10, Figs. 3 and 7, of a metal of relatively low thermal expansion, such as cold rolled steel or one of the low-expansion alloys used in pistons, is incorporated in the piston. This ring comprises sectors 9 which are enveloped by the piston metal and cast-anchored in the boss regions, Fig. 1, and sectors 10 which are only partially enveloped by the piston metal in the thrust face regions, Fig. 2. As described in Patent No. 2,780,505, and hereafter briefed, the control ring 9, 10 when incorporated in the piston operates to stress the sectors 10 and the piston metal thereover radially outwardly. In order to control such radial stress as desired, the rigidity of the control ring sectors 9 is radially greater than that of the sectors 10, as by making the depths of the sectors 9 radially greater than those of the sectors 10. In the embodiment shown in the drawing Figs. 1, 2 and 3, the cross-sections of sectors 10 are circular while the cross-sections of sectors 9 are generally rectangular, with their greater dimensions extending radially of the piston. The entire control ring may be integral, or the sectors may be joined by welding or brazing, or they may be separate and placed together in a mold and around a core.

As an example, a piston of an aluminum alloy, 90% Al, 9.5% Cu, 0.5% Mg, having a diameter of 4 inches, a length of 3.25 inches and proportioned as shown in the drawing, which is to scale, with a control ring of cold rolled steel, the sectors 10 each having a diameter between 0.120 and 0.130 inch and extending on an arc between 60° and 70°, and with the sectors 9 each between 0.190 and 0.200 inch wide (radially of the piston) and between 0.060 and 0.070 inch thick, and enveloped by the piston metal to the extent shown, controlled the piston diameter with a clearance of a few thousandths of an inch in service in an internal combustion engine.

The control ring is positioned in the piston as shown, with the middle parts of the sectors 9 enveloped and cast-anchored in the parts 5 in the regions of the wrist pin bosses. The sectors 10 are unanchored in the thrust faces. However, instead of continuing the envelopment of the sectors 9 into the thrust faces, as in Patent No. 2,780,505, while the sectors are continued beyond the pillars 5, they are left exposed inwardly so as to be unanchored beyond the pillars 5. A continuous ferrous ring 9, 10, viz., of a metal of relatively low thermal expansion, which in the embodiment shown is in the form of a wire, lies within and extends completely around the top of the skirt below the bottom packing groove, close to the outside of the skirt. In accordance with this embodiment, the ring is entirely enveloped by the alloy in the regions of the bosses, viz., in the pillars 5 but this envelopment extends partially into the thrust face regions, viz. along 32 and 33.

Referring now to Figs. 4–6, which illustrate a mold and core for making a piston, which may generally be that as shown in Patent Nos. 2,129,351, 2,676,371 and 2,676,372, 20 designates the outside mold, which is usually in sections sliding on a base and which is provided with cores 21 to form the holes for the wrist pin bosses. The core is a five-part core, comprising a three-part middle core consisting of parts 22, 23 and 24 and side cores 25, which latter form the wrist pin bosses. Core parts 23 and 24 are provided with arcuate recesses 26 in the regions of the thrust faces to receive the sectors 9, and the recesses 26 are continued into the core parts 25 at 28, 30 and 31 to receive the sectors 10 and 9 respectively. The recesses 30 are increased axially of the piston at 31 to form ledges 32 and 33 above and radially below the sectors 9, but with the inside edges of the sectors 9 exposed inside of the piston as shown in Fig. 2. Accordingly, the sectors 9 while wholly enveloped by the piston metal in the pillars 5 and therefore cast-anchored therein, the inside edges of those sectors are exposed so as to be unanchored beyond the pillars. The core parts 23 and 24 are extended upwardly at 35 along the sectors 10 and the recesses 31 are extended upwardly, as shown at 34, Fig. 4, along the thrust faces to the tops of the to-be-formed slots 7 and radially outwardly slightly beyond the bottom of the lowest ring groove. The core part 24 may also be provided with a rib 27 to form the vertical slot 8, and where such vertical slot is in both thrust faces the core part 23 is also provided wtih such a rib. This rib is recessed at 40 to free the sector 10 when the core part 24 is withdrawn. The core parts 23, 24 and 25 are thus recessed at 26 and 28 to about one-half of the cross-section of the sectors 10 and the side cores 25 are also recessed at 30 to receive the sectors 9, so as to receive and support the control ring on the core when it has been collapsed.

In the casting of this piston, see Figs. 4, 5 and 6, the ring 9, 10 is placed over the core and within the recesses 26, 28, 30, 31 and 40 therein while the core is collapsed, Fig. 6, so that when the core is expanded, Fig. 5, the ring will lie within the recesses. The mold sections are now closed and the alloy is cast. After the casting has solidified, core part 22 is retracted so as to permit the core parts 23 and 24 to move into the space vacated by the core part 22 and so as to clear the ring 9, 10 and also the vertical slot or slots 8. The core parts 23 and 24 are now also moved in radially and retracted so as to permit the side cores 25 to move into the space vacated by the core parts 22, 23 and 24, Fig. 6, in order to clear the wrist pin bosses. This movement of the side cores 25 will also free them from the ring 9, 10 because the circumferential extensions of the recesses 26, 30, 31 in the side core parts are sufficient to permit such freeing, because the chords of the side cores are smaller than the respective chordal dimensions of the casting. The mold is now opened to release the cores 21 and the casting can be picked off.

In the complete casting the control ring will lie within and extend completely around the top of the skirt and will be surrounded by the alloy in the pillars 5 in the regions of the bosses; however, the inner part of the ring is exposed extensively circumferentially and radially along the thrust face region or regions. The continuation of the sectors 9 of greater rigidity radially than that of the sectors 10 stiffens the ring without requiring envelopment of the piston metal thereover beyond the pillars 5. Furthermore, the parts 35, Fig. 4, on the core parts 23 and 24 are continued circumferentially into the core parts 25 as shown dotted at 34, Fig. 4, above the ring, in order to form with the parts 35 the circumferential recesses to the bottom of the to-be-formed lower ring groove 3. Accordingly, when this ring groove is cut, the circumferential slots 7 will be formed separating the skirt from the head to the extents of the parts 35 without any extra slotting being required. The construction and arrangement of the core parts 22, 23, 24 and 25, is however, such that they not only form the casting, but that they can be readily withdrawn from the casting.

When the alloy is cast on the piston and has solidified, upon cooling from molten to cold condition, the alloy will shrink much faster than will the steel ring so that the alloy will contract and finally arrive at a condition of tension. In so doing the control ring is placed under compression radially as well as circumferentially in the condition of the parts shown in full lines, Fig. 3. The effect will be to stress the sectors 10 and the piston metal thereover radially outwardly. The thrust faces are, however, at this time connected with the head. There will be no movement of the piston metal along the sectors 9 and 10, because any vertical slot 10 is closed by the core part 27. When now the circumferential slots 7 are cut, in this embodiment by cutting of the lowest packing groove 3, the control ring and the piston metal thereover will both move outwardly on the thrust face axis so as to form an oval contour of the piston as shown in dotted lines Fig. 3. It will, of course, be understood that the oval is exaggerated for illustrative purposes, because the actual distortion is small. The piston is now machined to size with the skirt of the usual round or oval contour. The piston will, however, remain round or oval (slightly) until in use in the engine; until then, the piston metal will remain under tension, while the ring will remain under compression.

In accordance with the illustrative embodiment of this invention, the sectors 9 are made of greater rigidity radially than the rigidity of the sectors 10, and the extensions of the sectors 9 beyond the enveloping piston metal along 5 are proportioned as to their length and cross-section in accordance with the radial outward stress to be imparted to the sectors 10 and the piston metal thereover along the thrust faces.

A piston of the character described and made as described can be made with a very low clearance and it will maintain a very close fit when either hot or cold. That is for the following reason: As the piston heats up, the head will, of course, expand radially in all directions. Such radial expansion of the head will, however, only be transmitted to the skirt in the region of the bosses. That will tend to relieve some of the strain along the wrist pin axis so that the control ring and the piston metal thereover will move out along that axis. That will cause the ring to tend to return to its original (viz., round or oval) form. In so doing, the strain in the alloy at the thrust faces is also relieved so as to move in with the control ring at those faces. The piston, even one of an aluminum alloy, will, therefore, remain conformed to the cylinder with a very low clearance.

Having thus described the invention, what is claimed and desired to be secured by Letters Patent is:

1. A trunk piston of a metal of relatively high thermal expansion, comprising, a head, a skirt provided with wrist pin bosses and thrust faces one of which is axially separated from the head, and a ring of a metal of relatively low thermal expansion lying within and extending completely around the top of the skirt, said ring having a first sector partially enveloped radially outwardly by the piston metal but partially exposed radially inwardly along an extended part of the separated thrust face so as to leave said first sector unanchored in said separated thrust face, said ring having second sectors displaced from said first sector, said second sectors being cast-enveloped for extended distances therealong by the piston metal in the boss regions so as to cast anchor said second sectors therein, adapted to stress said first sector and the piston metal thereover radially outwardly, the cross-sections of said second sectors being of greater rigidity and depths radially than the cross-section of said first sector and the second sectors being proportioned as to their cross-sections and lengths in accordance with the desired radial stress to be imparted to said first sector and the piston metal thereover.

2. A trunk piston of a metal of relatively high thermal expansion, comprising, a head, a skirt provided with wrist pin bosses and thrust faces both of which are axially separated from the head, and a ring of a metal of relatively low thermal expansion lying within and extending completely around the top of the skirt, said ring having first sectors partially enveloped radially outwardly by the piston metal but partially exposed radially inwardly along extended parts of the separated thrust faces so as to leave said first sectors unanchored in said separated thrust faces, said ring having second sectors displaced from said first sectors, said second sectors being cast-enveloped for extended distances therealong by the piston metal in the boss regions so as to cast anchor said second sectors therein, adapted to stress said first sectors and the piston metal thereover radially outwardly, the cross-sections of said second sectors being of greater rigidity and depths radially than the cross-sections of said first sectors and the second sectors being proportioned as to their cross-sections and lengths in accordance with the desired radial stress to be imparted to said first sectors and the piston metal thereover.

3. A trunk piston of a metal of relatively high thermal expansion, comprising, a head, a skirt provided with wrist pin bosses and thrust faces one of which is axially separated from the head, and a ring of a metal of relatively low thermal expansion lying within and extending completely around the top of the skirt, said ring having a first sector of circular cross-section partially enveloped radially outwardly by the piston metal but partially exposed radially inwardly along an extended part of the separated thrust face so as to leave said first sector unanchored in said separated thrust face, said ring having second sectors of general rectangular cross-section with their greater dimensions extending radially and said second sectors being displaced circumferentially from said first sector, said second sectors being cast-enveloped for extended distances therealong by the piston metal in the boss regions so as to cast anchor said second sectors therein, adapted to stress said first sector and the piston metal thereover radially outwardly, the cross-sections of said second sectors being of greater rigidity and depths radially than the cross-section of said first sector and the second sectors being proportioned as to their cross-sections and lengths in accordance with the desired radial stress to be imparted to said first sector and the piston metal thereover.

4. A trunk piston of a metal of relatively high thermal expansion, comprising, a head, a skirt provided with wrist pin bosses and thrust faces both of which are axially separated from the head, and a ring of a metal of relatively low thermal expansion lying within and extending completely around the top of the skirt, said ring having first sectors of circular cross-section partially enveloped radially outwardly by the piston metal but partially exposed radially inwardly along extended parts of the separated thrust faces so as to leave said first sectors unanchored in said separated thrust faces, said ring having second sectors of general rectangular cross-section with their greater dimensions extending radially and said second sectors being displaced circumferentially from said first sectors, said second sectors being cast-enveloped for extended distances therealong by the piston metal in the boss regions so as to cast anchor said second sectors therein, adapted to stress said first sectors and the piston metal thereover radially outwardly, the cross-sections of said second sectors being of greater rigidity and depths radially than the cross-sections of said first sectors and the second sectors being proportioned as to their cross-sections and lengths in accordance with the desired radial stress to be imparted to said first sectors and the piston metal thereover.

References Cited in the file of this patent

UNITED STATES PATENTS

| | | |
|---|---|---|
| 1,731,904 | Nelson | Oct. 15, 1929 |
| 2,780,505 | Venner et al. | Feb. 5, 1957 |